United States Patent
Schneider

(10) Patent No.: US 8,640,802 B2
(45) Date of Patent: Feb. 4, 2014

(54) RADIATOR GRILL FOR A MOTOR VEHICLE

(75) Inventor: Jurgen Schneider, Worms (DE)

(73) Assignee: Rochling Automotive AG & Co. KG, Mannheim (DE)

( * ) Notice: Subject to any disclaimer, the term of this patent is extended or adjusted under 35 U.S.C. 154(b) by 217 days.

(21) Appl. No.: 13/213,461

(22) Filed: Aug. 19, 2011

(65) Prior Publication Data

US 2012/0043146 A1    Feb. 23, 2012

(30) Foreign Application Priority Data

Aug. 20, 2010  (DE) .......................... 10 2010 039 620

(51) Int. Cl.
*B60K 11/08* (2006.01)

(52) U.S. Cl.
USPC ...................... 180/68.1; 123/41.04; 296/193.1

(58) Field of Classification Search
USPC ........... 180/68.1, 68.2, 68.3, 68.6; 296/193.1; 293/115; D12/163; 454/268, 278, 275, 454/265; 123/41.04
See application file for complete search history.

(56) References Cited

U.S. PATENT DOCUMENTS

| | | | | |
|---|---|---|---|---|
| 1,737,946 | A | * 12/1929 | Rood | 49/80.1 |
| 1,804,165 | A | * 5/1931 | Holub | 49/51 |
| 1,820,195 | A | * 8/1931 | Johnson | 160/209 |
| 1,950,792 | A | 3/1934 | Green | |

(Continued)

FOREIGN PATENT DOCUMENTS

| | | | |
|---|---|---|---|
| AT | 4175 | * | 3/2001 |
| DE | 3151435 | | 7/1982 |

(Continued)

OTHER PUBLICATIONS

"Search Report—German patent Application No. 102010039620.6", Aug. 20, 2010, 8 pages (No English translation available).

*Primary Examiner* — Katy M Ebner
*Assistant Examiner* — Emma K Frick
(74) *Attorney, Agent, or Firm* — Kilpatrick Townsend & Stockton LLP

(57) ABSTRACT

A radiator grill (10) for a motor vehicle comprises: a frame (12) for securing the radiator grill (10) to the vehicle, wherein a condition in which the radiator grill (10) is mounted on the vehicle will be designated in the following as the reference condition of the radiator grill (10), and wherein the frame (12) in the reference condition of the radiator grill (10) relative to the motor vehicle is mounted substantially immovably thereon, at least one air-conducting element (20) which extends along an air-conducting element longitudinal axis (L) and at least in sections forms at least one part of an outer side (21) of the radiator grill (10), at least one air-passage opening (30) which is designed to allow cooling air to flow into a motor vehicle interior region (24), which in the reference condition of the radiator grill (10) and during travel operation of the motor vehicle flows on to the outer side (21) of the radiator grill (10) counter to a travel direction (F), as well as at least one air flap (16) with a flap outer surface (27) and a flap axis (28), wherein the air flap (16) can move, at least between a closed position and an open end position, relative to the air-conducting element (20) in an adjusting movement comprising a pivoting movement about the flap axis (28) so as to vary an opening cross-section of the air-passage opening (30), wherein the air-conducting element (20) completely obscures over more than half of its axial extension, preferably over its entire axial extension, the air flap (16) in its open end position, viewed counter to the travel direction (F).

9 Claims, 2 Drawing Sheets

(56) References Cited

U.S. PATENT DOCUMENTS

| | | | |
|---|---|---|---|
| 3,084,715 A | | 4/1963 | Scharres |
| 4,268,995 A | * | 5/1981 | Villa ............................... 49/87.1 |
| 4,399,970 A | * | 8/1983 | Evans ........................... 244/214 |
| 4,410,032 A | | 10/1983 | Mori |
| 7,717,208 B2 | | 5/2010 | Knauer |
| 7,757,643 B2 | * | 7/2010 | Harich et al. ............... 123/41.04 |
| 8,302,714 B2 | * | 11/2012 | Charnesky et al. .......... 180/68.1 |
| 8,398,131 B2 | * | 3/2013 | Boutaris et al. ............... 293/115 |
| 8,473,164 B2 | * | 6/2013 | Charnesky et al. ............. 701/49 |
| 8,505,660 B2 | * | 8/2013 | Fenchak et al. .............. 180/68.1 |
| 2011/0005851 A1 | * | 1/2011 | Doroghazi et al. .......... 180/68.1 |
| 2011/0226541 A1 | * | 9/2011 | Hori et al. .................... 180/68.1 |
| 2012/0067655 A1 | * | 3/2012 | Charnesky et al. .......... 180/68.1 |
| 2012/0074729 A1 | * | 3/2012 | Fenchak et al. ............ 296/193.1 |
| 2013/0025952 A1 | * | 1/2013 | Kitashiba et al. ............ 180/68.1 |
| 2013/0092462 A1 | * | 4/2013 | Chinta ........................ 180/68.1 |

FOREIGN PATENT DOCUMENTS

| | | |
|---|---|---|
| DE | 20021023 | 2/2001 |
| DE | 102004048038 | 4/2004 |
| DE | 102009009141 | 8/2010 |
| JP | 2010167942 | 8/2010 |
| WO | WO-2010034489 | 4/2010 |

* cited by examiner

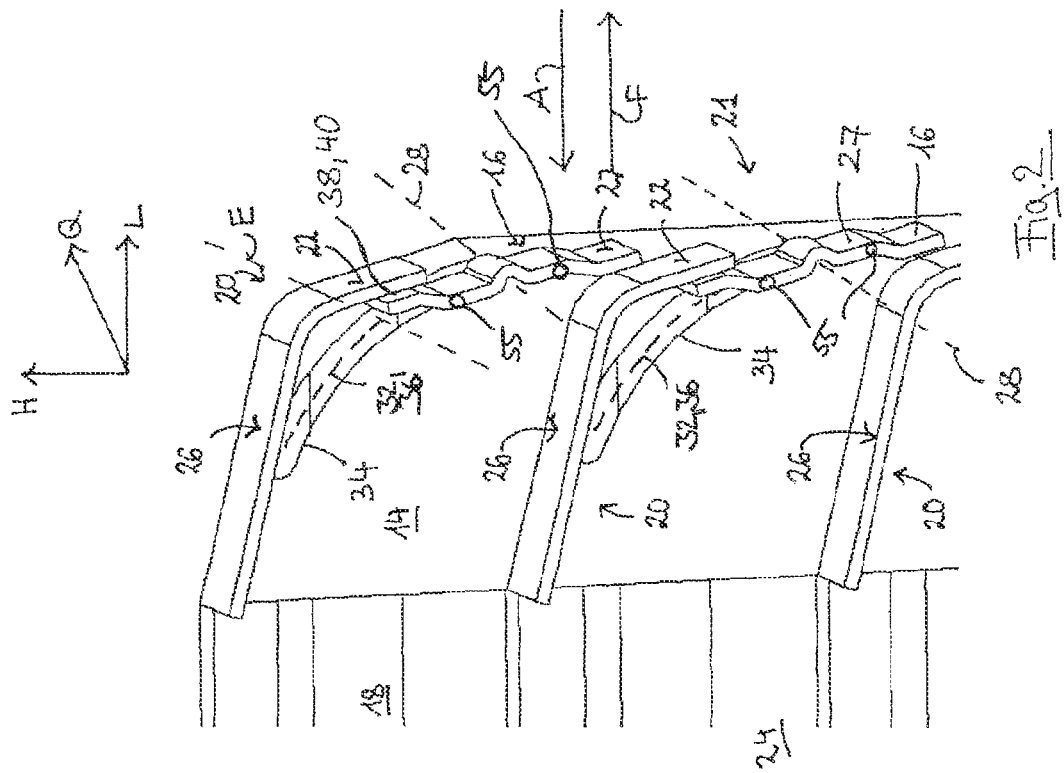
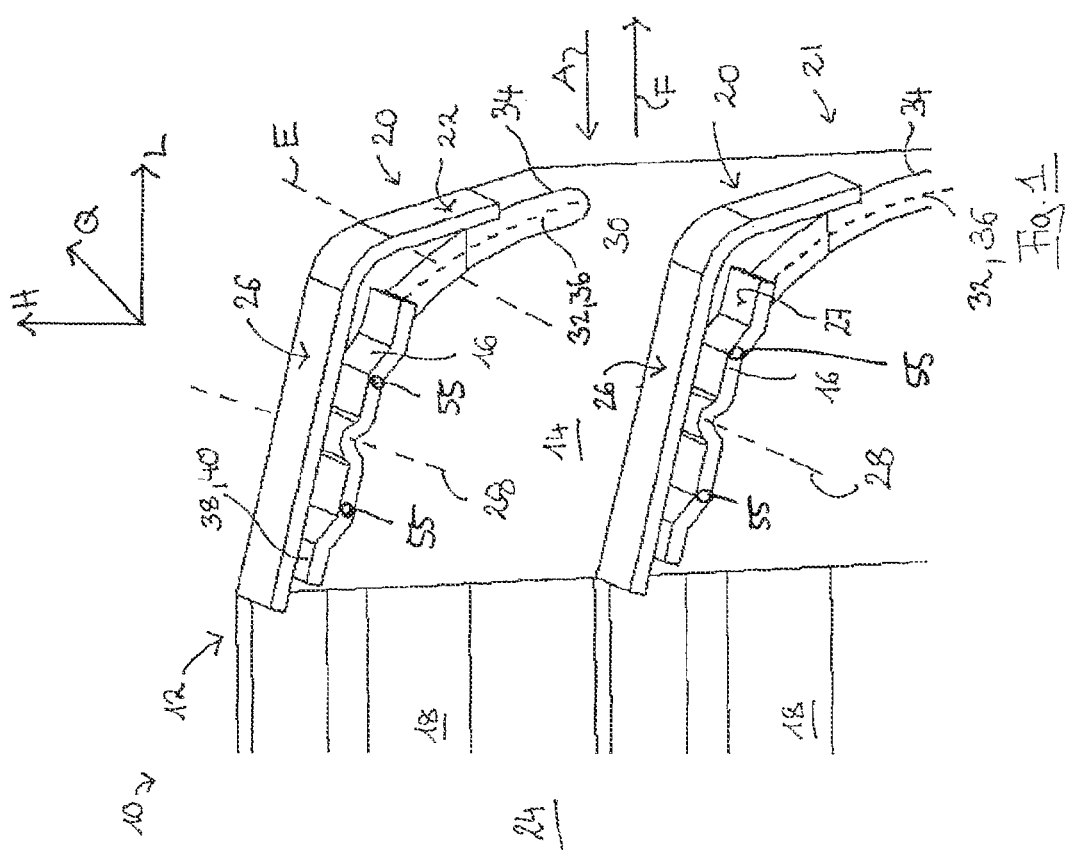

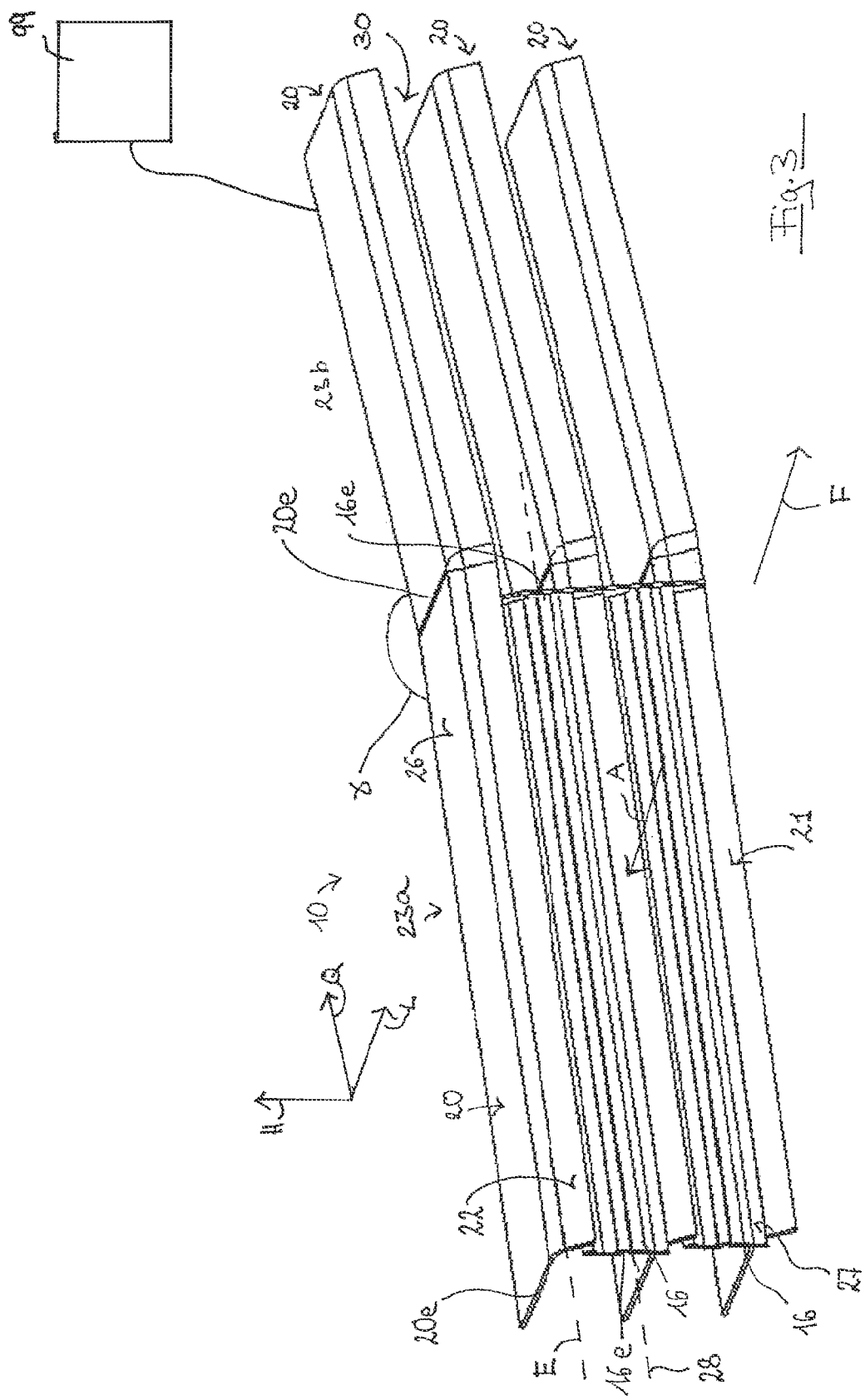

RADIATOR GRILL FOR A MOTOR VEHICLE

RELATED APPLICATION

This application claims the benefit of application 10 2010 039 620.6, filed in Germany on Aug. 20, 2010, the entire contents of which are incorporated herein by this reference.

The present invention relates to a radiator grill for a motor vehicle, comprising: a frame for securing the radiator grill to the vehicle, wherein a condition in which the radiator grill is mounted on the motor vehicle will be designated in the following as the reference condition of the radiator grill, and wherein the frame in the reference condition of the radiator grill is mounted substantially immovably on the motor vehicle relative to the motor vehicle, at least one air-conducting element which extends along an air-conducting element longitudinal axis and at least in sections forms at least one part of an outer side of the radiator grill, at least one air-passage opening which is designed to allow cooling air to flow into a motor vehicle interior region, which in the reference condition of the radiator grill and during travel operation of the motor vehicle flows on to the outer side of the radiator grill counter to a travel direction, as well as at least one air flap with a flap outer surface and a flap axis, wherein the air flap can move, at least between a closed position and an open end position, relative to the air-conducting element in an adjusting movement comprising a pivoting movement about the flap axis so as to vary an opening cross-section of the air-passage opening.

Here the term "closed position" means that position of the air flap in which the opening cross-section of the air-passage opening is minimal and the term "open end position" means that position of the air flap in which the opening cross-section is at maximum.

At a number of places in the following, location or direction indications will be used in the description of the radiator grill, which refer to the reference condition of the radiator grill, i.e. to the condition mounted on the motor vehicle, for example vehicle longitudinal direction or vehicle transverse direction.

In this case, for a given radiator grill generally even in the non-mounted condition it is clear to a skilled person in which orientation the radiator grill is to be mounted on the motor vehicle so that the vehicle-related location and direction indications of the reference condition are also applicable to the non-mounted radiator grill.

The air-conducting element of a radiator grill directs the cooling air flowing on to the outer side of the radiator grill during travel operation through the air-passage opening to the vehicle parts to be cooled in the motor vehicle interior region. The shape and arrangement of the air-conducting element or the air-conducting elements of a radiator grill can in this case determine in a formative manner the design of the motor vehicle for a given vehicle brand and/or a given vehicle model.

The publication DE 31 51 435 A1 discloses a radiator grill which has as air-conducting elements an arrangement of stationary slats extending in the transverse direction of the vehicle and spaced apart in the vertical direction of the vehicle, as well as an arrangement of slats as air flaps, which are movable in translation in the longitudinal direction of the vehicle and each of which are disposed in the spaces between adjacent stationary slats. By displacing the movable slats arrangement relative to the stationary slats arrangement in the longitudinal direction of the vehicle it is possible to vary the proportion of the cooling air flowing into a motor vehicle interior region to the cooling air flowing on to the front of the vehicle during travel operation. However, only relatively small opening cross-sections can be achieved with a radiator grill of this type. A similar radiator grill is disclosed in the publication DE 10 2004 048 038 A1.

The Patent Specification U.S. Pat. No. 1,950,792 B1 discloses a radiator grill which also comprises a grid of stationary slats and grid of jointly movable slats which can be adjusted in a displacing movement so as to vary the opening cross-section of air-passage openings formed between the slats of the stationary grid. In this case, the grid of movable slats can be displaced in such a way that, in an open end condition, the movable slats, viewed counter to the travel direction, are situated behind the stationary slats. However, simple geometrical considerations show that with such a radiator grill at most half the area of the radiator grill can be freed for the passage of air.

Larger opening cross-sections in relation to the area of the radiator can be achieved with pivotable air flaps.

A radiator grill of the type defined above with pivotable air flaps is known from the publication WO 2010/034489 A1.

This radiator grill is designed to direct cooling air, which is flowing on to the outside of the radiator grill, in the open end position of the air flaps via portions of the air flaps obliquely downwards towards the vehicle floor so as to cool units mounted there.

Therefore, in this radiator grill of the type defined above the cooling air flowing in travel operation on to the outside of the radiator grill flows to a large extent on to the air flaps even in their open end position.

On the one hand, with such a radiator grill relatively high adjusting forces are necessary in order to maintain the movable air flaps reliably in the desired open end position, while the cooling air is flowing on to them and thus forces are acting on them.

Furthermore, the air flaps on to which the air is flowing also influence in the open end position the path of the cooling air and, therefore, have to be taken into consideration in the design of the cooling air ducting.

Therefore, it is the object of the present invention to reduce the flow on to the air flap in the open end position.

According to the invention, this object is achieved in that in a radiator grill of the type defined above the air-conducting element completely obscures over more than half of its axial extension, preferably over its entire axial extension, the air flap in its open end position, viewed counter to the travel direction. The term "axial" refers here to the longitudinal axis of the air-conducting element.

Normally, the air flap is formed separately from the air-conducting element.

Since the movable air flap, counter to the travel direction, i.e. viewed substantially in the incoming flow direction, is completely obscured by the air-conducting element at least over a majority of its axial extension, the air flow on to air flap is reduced in extent compared with a radiator grill of the type defined above.

Furthermore, in this way in its open end position the air flap is essentially not visible from the exterior and thus does not influence the design of the radiator grill. The absence of visible movable parts in the open end position of the air flap additionally conveys the impression of increased stability. Moreover, in the open end position of the air flaps, the radiator grill according to the invention makes it possible to achieve larger flow cross-sections than in the radiator grill of the type defined above.

If the air-conducting element completely obscures the air flap over its entire axial extension, the air flap projects at most at one or both longitudinal ends of the air-conducting element beyond the latter.

The above-mentioned reduction in the flow on to the air flap in its open end position can be maximised in that the air flap in the open end position, viewed counter to the travel direction, is completely obscured by the air-conducting element.

The radiator grill according to the invention can be provided with a plurality of air-passage openings, as well as air-conducting elements and air flaps associated therewith having the above-described features so as, for instance, to direct air towards different zones of the vehicle or to increase overall the cooling air throughput. Here the construction of the radiator grill is described for reasons of practicability for (at least) one air-passage opening, one air flap and one air-conducting element, wherein it also not to be excluded that the radiator grill can have precisely one air-passage opening, one air flap and one air-conducting element.

In principle, it should also not be excluded that the air-conducting element is also movable relative to the frame but usually the air-conducting element is provided immovably on the frame.

According to a preferred development, the air-conducting element can have an air-conducting element front plate which forms at least one part of the outer side of the radiator grill and which over more than half its axial extension, preferably over its entire axial extension, completely obscures the air flap in its open end position, viewed counter to the travel direction. In this way, in its open end position, the air flap can be accommodated directly behind the air-conducting element front plate and the radiator grill can be configured in an advantageously compact manner in the vehicle longitudinal direction.

Furthermore, it may be provided for the air-conducting element to have an air-conducting plate projecting at an angle from the air-conducting element front plate in the reference condition towards a motor vehicle interior region. Therefore, on the one hand, it is possible simply to provide ducting for cooling air into the vehicle interior region and, on the other hand, to prevent cooling air, which is flowing on the outer side of the radiator grill counter to the travel direction, from penetrating in the open end position of the air flap between the air flap and the air-conducting element, which gives rise to the danger of undesirable turbulence and a reduction in cooling performance.

To reduce the number of components, the air-conducting element front plate and the air-conducting element air-conducting plate are preferably in the form of a common one-piece component.

To reduce air turbulence at edges and thereby improve the aerodynamics, it is also possible to provide that, in the closed position, the flap outer surface is aligned with an outer side of the air-conducting element front plate.

This can be achieved in a simple manner structurally in that the adjusting movement further comprises a translatory displacing movement of the flap axis along a displacement trajectory orthogonally to the flap axis, wherein preferably the flap axis is stationary with respect to the air flap, for example by the air flap being displaced from its closed position firstly slightly in the vehicle longitudinal direction towards the motor vehicle interior region and only then being moved to increase the opening cross-section.

A further general advantage of this type of adjusting movement lies in that it makes possible greater structural freedom in the design of the radiator grill. For example, the air flap can be moved along a displacement trajectory adapted to requirements in respect of the desired path of the cooling air and in respect of space requirement, and can be accommodated in the open end position at almost any suitable position in which the air flap is for the most part obscured by the air-conducting element.

An advantageous guide for providing a suitable displacing movement can be provided in a simple structural manner in that the air flap is mounted movably on the frame, wherein the frame comprises a respective control cam on two opposite sides so as to guide the displacing movement of the flap axis, the displacement trajectory being determined by the shape of the control cams.

The definition of the control cam should not exclude here that the displacing movement can also follow a straight or in sections substantially rectilinear trajectory.

In particular, the configuration of the adjusting movement of the air flap as a superposition of a displacing movement orthogonally to the flap axis and a pivoting movement about the flap axis offers the possibility of adjusting the flap at least over a portion of its adjusting path so that a variation in the opening cross-section is made possible largely without any variation in the flow direction, whereas with a purely pivoting movement owing to the variation in the opening cross-section because of the varying angle of attack of the flap the direction is necessarily changed in which the cooling air is directed through the air-passage opening.

For example, it is possible to move the air flap, starting from the closed position, in an initial phase of an opening movement only translationally in the vertical direction of the vehicle so as to vary the opening cross-section of the air-passage opening, and to pivot the flap only in a subsequent phase of the opening movement so as to enable it to be positioned in a space-saving manner in the open end position, viewed counter to the travel direction, behind a front portion of the air-conducting element.

A simple mounting can be achieved in that the air flap comprises at at least one longitudinal end a pivot which is mounted displaceably along a control cam and also pivotably about the flap axis.

Furthermore, for the mounting of the pivoting movement it may be provided for the air flap to comprise at each of its longitudinal ends precisely one pivot as a stub axle, the two stub axles defining the flap axis. In this case, the course of the control cams is substantially identical to the course of the displacement trajectory.

It may also be provided that the radiator grill comprises a pivot-drive device which is designed to pivot the air flap about the flap axis. In particular, in the above-mentioned case of a mounting by precisely one stub axle at each longitudinal end of the air flap, it is possible to provide a separate pivot-drive device which enables the pivoting movement to be driven independently of the displacing movement and, therefore, to bring about a plurality of adjusting movements with the same apparatus and the same control cams.

However, to simplify the drive it may alternatively also be provided that the air flap comprises at each of its longitudinal ends a respective pair of pivots as guide pivots which are spaced apart perpendicularly to the flap axis, wherein each pair of guide pivots is mounted along a control cam movably on the frame of the radiator grill. In such a radiator grill, the air flap is guided in a type of link drive so that it is possible to dispense with a separate pivot-drive device.

To drive the displacing movement it may be provided that the radiator grill comprises a displacement-drive device which is designed to adjust the air flap so that the flap axis is displaced along the displacement trajectory.

In the above-described case of an air flap with a pair of guide pivots at each longitudinal end, the displacement-drive device can control both the displacing movement and the pivoting movement of the air flap, wherein the displacement trajectory is then determined substantially by the course of the control cams and the distance apart of the guide pivots.

To prevent closing or vibration noise, it may further be provided for the air flap or the air-conducting element to comprise at least one damping element which is provided on the air flap or on the air-conducting device in a zone in which, in the closed position of the air flap, the air-conducting device and the air flap contact one another, and which comprises an elastic and/or soft material.

Preferably, the damping element can be arranged so that in its closed position the air flap tightly, in particular fluidtightly, closes the air-passage opening.

In order to prevent the displacement-drive device and/or the pivot-drive device from influencing the flow path of the cooling air which in travel operation flows on to the outer side of the radiator grill, it may further be provided that the pivot-drive device and/or the displacement-drive device, viewed counter to the travel direction, is/are arranged free of overlap with respect to the air-passage opening.

Furthermore, in this way the respective drive device is also not visible from the exterior and does not affect the visual overall impression of the vehicle.

The present invention will be illustrated below with reference to a preferred example of embodiment which is illustrated in the accompanying FIGS. 1 to 3, wherein:

FIG. 1 shows essential parts of a first example of embodiment of a radiator grill according to the invention in a perspective view, wherein the air flaps are situated in their open end position;

FIG. 2 shows the subject-matter of FIG. 1 with the air flaps in their closed position, and FIG. 3 shows a further perspective view of the first example of embodiment.

For reasons of clarity, in the drawings, in particular in the case in which a plurality of like components are present, not all the components and/or their constituent parts are always provided with reference numerals.

FIG. 1 shows a preferred example of embodiment of a radiator grill according to the invention, which will be denoted by the reference numeral 10 in the following.

The drawing shows parts of a frame 12 of the radiator grill 10, in particular a mounting plate 14, on which air flaps 16 are movably mounted, two flaps of which are shown in the Figure, as well as a plurality of fastening struts 18 which in the reference condition of the radiator grill 10 extend in the vehicle longitudinal direction L and which serve to fasten the radiator grill 10 to the motor vehicle (not shown in further detail here).

In order to allow a view of the mounting of the air flaps 16 on the frame 12, an illustration of the mounting plate, which is situated in the vehicle transverse direction Q opposite the mounting plate 14 visible in the drawing, and of the fastening struts provided there as well as the other air flaps (cf. FIG. 3) has been omitted.

A plurality of air-conducting elements 20 extending essentially in the vehicle transverse direction Q are mounted on the frame and two of which are evident in the illustration of FIG. 1. The air-conducting elements 20 are each in the form of angled slats extending along an air-conducting element longitudinal axis E, with an air-conducting element front plate 22 which forms part of the outer side 21 of the radiator grill 10 and an air-conducting plate 26 projecting at an angle from the air-conducting element front plate 22 towards a motor vehicle interior region 24.

In the present case, the air-conducting element longitudinal axes E extend at a very small angle, barely evident in the illustration, to the vehicle transverse direction Q (cf. FIG. 3); in principle, however, it is also possible for them to extend precisely in the vehicle transverse direction Q or at a larger angle thereto.

Therefore, in the reference condition of the radiator grill 10, the air-conducting elements 20 are arranged spaced apart vertically, i.e. spaced apart in the vehicle vertical direction H so that a respective air-passage opening 30 is formed between adjacent air-conducting elements 20.

Cooling air flowing on to the outer side 21 of the radiator grill 10 can then flow through the air-passage opening into the vehicle interior region 24 in the open end position of the air flaps 16 shown in FIG. 1 during travel operation of the motor vehicle.

Each air-passage opening 30 is here associated with a respective air flap 16 which can be adjusted in an adjusting movement, which comprises a pivoting movement about its flap axis 28, between the open end position shown in FIG. 1 and the closed position shown in FIG. 2 so as to vary the opening cross-section of the air-passage opening 30.

As is evident in FIG. 1, each air flap 16 is also associated with one of the air-conducting elements 20 which over its entire axial extension (i.e. along the air-conducting element longitudinal axis E) completely obscures the respective air flap 16 in its open end position, counter to the travel direction F, i.e. viewed in the incoming flow direction A. Therefore, in their open end position the air flaps 16 can project at most slightly over one or both longitudinal ends 20e (cf. FIG. 3) of the air-conducting elements 20; however, it may also be provided for the air flaps 16 to be completely obscured by the air-conducting elements 20.

In this way, at least in the open end position, the air flaps 16 are not or only to a very small extent acted upon by the incoming cooling air flowing into the vehicle interior region 24, which requires much lower adjusting forces to maintain the flaps in the open end position and, furthermore, makes it possible to ensure that the path of the cooling air in the vehicle interior region 24 in the open end position of the air flaps 16 is substantially not influenced thereby.

More precisely, in the present case each air flap 16 in its open end position is obscured by the air-conducting element front plate 22 of the associated air-conducting element 20.

Owing to the design of the air-conducting elements 20 as angled slats, it is possible for the air flaps 16 in the open end position to be mounted directly behind the air-conducting element front plates 22 and thus make possible a compact configuration of the radiator grill 10 in the vehicle longitudinal direction L.

At each of their two longitudinal ends 16e (cf. FIG. 3) the air flaps 16 are mounted pivotably by a stub axle (not shown here), which extends coaxially to the flap axis 28, in a control cam 32 indicated by a dashed line in the drawings and displaceably along the control cam 32, wherein in the present case the control cams 32 are formed structurally by control grooves 34 which are provided in the mounting plates 14 of the frame 12.

The course of the control cams 32, which in the guide provided in the present case by precisely one stub axle at each longitudinal end 16e of the air flap 16 corresponds to the course of the displacement trajectory 36, can be adjusted substantially freely and can be adapted to the requirements of the respective motor vehicle.

FIG. 2 shows the subject-matter of FIG. 1, wherein the air flaps 16 are here situated in their closed position in which the opening cross-section of the air-passage openings 30 is largely closed by the air flaps 16.

At the locations of the air flaps 16 designated 38 it is possible in each case for a damping element 40 to be provided, which consists of an elastic or at least soft material and thus, firstly, reduces closing noises and troublesome vibration noise of the air flaps during the adjusting movement and, secondly, with suitable choice of material and position of the damping element, can ensure tight, in particular fluidtight, closing of the air-passage openings 30 through the air flaps 16 in their closed position. Alternatively or additionally thereto, similar damping elements can be provided on the air-conducting elements.

As is evident from the shape of the control cams 32 and the displacement trajectories 36, the air flaps 16 move during their adjusting movement from the closed position shown in FIG. 2 into the open end position shown in FIG. 1, initially substantially translationally upwards in the vehicle vertical direction H so that the opening cross-section of the air-passage openings 30 is varied, without substantially varying qualitatively the flow direction for the cooling air flowing into the motor vehicle. Only in the course of the further adjusting movement are the air flaps 16 pivoted about the flap axes 28 by almost 90° with respect to their closed position so that in their open end position they can be accommodated in a space-saving manner behind the air-conducting element front plates 22 and can be completely obscured by them.

With reference to FIG. 3, in some embodiments a pivot-drive device and/or a displacement-drive device 99, optionally formed separately therefrom, may be provided e.g. on the other side of the mounting surface 14 of the frame 12, viewed counter to the travel direction, free of overlap with respect to the air-passage openings 30, e.g. behind a suitable trim, so that the cooling air flowing into the motor vehicle interior region does not also flow on to the drive devices which are not visible from the exterior.

As an alternative to the design of air flap illustrated in FIGS. 1 to 3 with a respective stub axle at each longitudinal end, it may be provided for the air flaps to be guided at each of their longitudinal ends by means of a pair of guide pivots 55 in the control groove, which are spaced apart perpendicularly to the flap axis. In this way, the pivot position of the respective air flap is clearly determined by their instantaneous position on the control cam, and by using a drive of the link drive type it is possible, optionally, to dispense with a separate pivot-drive device. In this case, the course of the displacement trajectory is not identical to the course of the control cams but is determined by the latter and by the distance between the guide pivots 55 of the pairs.

FIG. 3 shows essential parts of the radiator grill 10 according to the invention in a perspective illustration, viewed obliquely from the front. In the illustrated example of embodiment, two groups 23a, 23b of in each case three air-conducting elements 20 are provided which are spaced apart in the vehicle vertical direction H, wherein the two groups 23a and 23b are disposed in the plane perpendicular to the vehicle vertical direction H at an obtuse angle γ to one another.

For reasons of clarity, the frame 12 (cf. FIGS. 1 and 2) and the motor vehicle are not illustrated in FIG. 3.

In the illustration of FIG. 3, for illustrative purposes the air flaps 16 for the left-hand group 23a of air-conducting devices 20 are each in their closed position and for the right-hand group 23b of air-conducting devices 20 they are each in their open end position.

As shown in FIG. 3, in the open end position of the air flaps 16 the exterior appearance of the radiator grill 10 remains largely unaffected by the air flaps 16. In particular, during travel operation, in the open end position of the air flaps 16 incoming air does not flow on to any movable parts and no movable parts are visible from the exterior to a passer-by standing in front of the vehicle.

The invention claimed is:

1. A radiator grill for a motor vehicle, comprising:
   a frame for securing the radiator grill to the motor vehicle, wherein a condition in which the radiator grill is mounted on the motor vehicle will be designated in the following as the reference condition of the radiator grill, and wherein the frame in the reference condition of the radiator grill is mounted substantially immovably on the motor vehicle relative to the motor vehicle,
   at least one air-conducting element which extends along an air-conducting element longitudinal axis and at least in sections forms at least one part of an outer side of the radiator grill,
   at least one air-passage opening which is designed to allow cooling air to flow into a motor vehicle interior region, which in the reference condition of the radiator grill and during travel operation of the motor vehicle flows to the outer side of the radiator grill counter to a travel direction, and
   at least one air flap with a flap outer surface and a flap axis, wherein the air flap can move, at least between a closed position and an open end position, relative to the air-conducting element in an adjusting movement which is a superposition of a pivoting movement about the flap axis and of a displacing movement of the flap axis along a displacement trajectory orthogonally to the flap axis, so as to vary an opening cross-section of the air-passage opening, wherein the air-conducting element completely obscures the air flap over more than half of the extension of the air conducting element along the air-conducting element longitudinal axis when the air flap is in its open end position, viewed counter to the travel direction, wherein the air flap comprises at each of its longitudinal ends a respective pair of pivots as guide pivots which are spaced apart perpendicularly to the flap axis, wherein each pair of guide pivots is mounted so as to be guided along a control cam provided on the frame of the radiator grill.

2. A radiator grill according to claim 1,
   wherein the air flap in its open end position, viewed counter to the travel direction, is completely obscured by the air-conducting element.

3. A radiator grill according to claim 1,
   wherein the air-conducting element is provided immovably on the frame.

4. A radiator grill according to claim 1, wherein the air-conducting element has an air-conducting element front plate which forms at least one part of the outer side of the radiator grill and which, over more than half of its extension along the air-conducting element longitudinal axis, completely obscures the air flap in its open end position, viewed counter to the travel direction.

5. A radiator grill according to claim 4,
   wherein the air-conducting element also has an air-conducting plate projecting at an angle from the air-conducting element front plate in the reference condition towards a motor vehicle interior region.

6. A radiator grill according to claim 4, wherein, in the closed position, the flap outer surface is aligned with an outer side of the air-conducting element front plate.

7. A radiator grill according to claim 1,
wherein the radiator grill further comprises a displacement-drive device which is designed to adjust the air flap so that the flap axis is displaced along the displacement trajectory.

8. A radiator grill according to claim 1,
wherein the air flap or the air-conducting element further comprises at least one damping element which is mounted on the air flap or on the air-conducting device in a zone in which, in the closed position of the air flap, the air-conducting device and the air flap contact one another, and which comprises an elastic or soft material.

9. A radiator grill according to claim 1,
wherein the displacement-drive device, viewed counter to the travel direction, is arranged free of overlap with respect to the air-passage opening.

\* \* \* \* \*